United States Patent [19]
Tsumura

[11] Patent Number: 5,987,607
[45] Date of Patent: Nov. 16, 1999

[54] COPY PREVENTING SYSTEM FOR MULTI-MEDIA EQUIPMENT

[75] Inventor: Tomoki Tsumura, Yokohama, Japan

[73] Assignee: Matsushita Electric Industrial Co., Ltd., Osaka, Japan

[21] Appl. No.: 08/832,593

[22] Filed: Apr. 2, 1997

[30] Foreign Application Priority Data

May 8, 1996 [JP] Japan .................................. 8-113988

[51] Int. Cl.⁶ .................................................. G06F 12/14
[52] U.S. Cl. ............................... 713/200; 714/38; 380/3
[58] Field of Search ............................ 395/186, 187.01, 395/183.14, 701, 704; 380/3, 4, 23, 25; 713/200, 201, 202; 714/38

[56] References Cited

U.S. PATENT DOCUMENTS

| | | | |
|---|---|---|---|
| 4,688,169 | 8/1987 | Joshi ...................................... | 364/200 |
| 4,796,220 | 1/1989 | Wolfe ..................................... | 364/900 |
| 4,924,328 | 5/1990 | Endoh et al. ........................... | 360/60 |
| 5,182,770 | 1/1993 | Medveczky et al. ................... | 380/4 |
| 5,231,546 | 7/1993 | Shimoda ................................. | 360/60 |
| 5,668,873 | 9/1997 | Yamauchi ............................... | 380/5 |
| 5,675,323 | 10/1997 | Ho ........................................... | 340/825.31 |
| 5,689,559 | 11/1997 | Park ......................................... | 380/3 |
| 5,778,064 | 7/1998 | Kori et al. ............................... | 380/5 |
| 5,781,627 | 7/1998 | Ikuta et al. .............................. | 380/3 |

FOREIGN PATENT DOCUMENTS

| | | | |
|---|---|---|---|
| 0286437 | 10/1988 | European Pat. Off. | ........ G11B 20/00 |
| 0593305 | 4/1994 | European Pat. Off. | ........ G11B 23/28 |
| 0739008 | 10/1996 | European Pat. Off. | ........ G11B 20/00 |
| 0778513 | 6/1997 | European Pat. Off. | .......... G06F 1/00 |
| 9216944 | 10/1992 | WIPO | ............................. G11B 20/00 |

*Primary Examiner*—Dieu-Minh T. Le
*Attorney, Agent, or Firm*—Lowe Hauptman Gopstein Gilman & Berner

[57] ABSTRACT

The present invention aims to provide a system, which can prevent unauthorized copying of information in a society covered by a network and can exclude distribution and diffusion of information in the network or package media. In a system comprising a receiving unit connected to broadcasting and/or communication network, there are provided a transmitting unit, a writing unit to a package medium, a reading unit, a reproducing unit for displaying and reproducing the information, and a management unit including a filing unit, each of these units has an ID to define a space to which that unit belongs, and by comparing it with a space ID, which defines a space where the information can be utilized and is added to the information transferred within the system, the compatibility of the utilization, i.e. whether the information is being utilized in an authorized space or not, is checked and unauthorized utilization of information or unauthorized copying are prevented.

13 Claims, 2 Drawing Sheets

COPY PREVENTING SYSTEM FOR MULTI-MEDIA EQUIPMENT

BACKGROUND OF THE INVENTION

1. Field of the Invention

The present invention relates to a copy preventing system for preventing unauthorized copying or utilization of copyrighted multi-media digital information when such information is provided to a multi-media equipment owned by a user in form of communication or broadcasting media or package media.

2. Description of the Related Art

With development and progress of digital information technique in recent years, various types of multi-media information such as audio information or visual information are digitalized and offered to users. Because the information is not deteriorated even when it is repeatedly copied, the infringement of copyright by copying is a serious problem. In particular, digital ROM information such as the information on a compact disk (CD) is widely propagated and large capacity media are now used in practical application, by which the user can record digital information. This creates a situation where unauthorized copying of the information can be carried out in a relatively easy manner.

However, the conventional type multi-media equipment as described above is not provided with the function to restrict copying of the information or to limit copying beyond a certain extent. For this reason, when copyright information is offered, importance is now put on information protective system to prevent unauthorized copying and to maintain security of the offered information. At present, a relatively simple copy preventing system such as SCMS (serial copy management system) is used in practical application, which permits second-generation copying, i.e. re-copying, but not the third generation copying, i.e. re-re-copying, in digital audio tape (DAT) and the like. This is merely to restrict copying of information recorded on a recording medium DAT, and does not provide a security guard on the information itself, which is the content of the recording. It is currently expected that there will be more demand on the system, which can cope with the diversified requirements of the copyright information providers or the users. More advanced digital information providing means is expected to appear in near future, and large capacity digital information recording medium writable by the users will be used in practical application.

In particular, to the propagation of high-speed information network aiming at home or private users or of large capacity digital medium such as digital video disk (DVD), systematic measures should be taken for the prevention of illegal or unauthorized copying.

SUMMARY OF THE INVENTION

To solve the above problems, it is an object of the present invention to provide a simple copy preventing system, which can cope with the high-speed transmission medium such as digital broadcasting, high-speed information network or large capacity digital recording package medium and is interchangeable with the digital package medium already in the market.

To attain the above object, the copy preventing system according to the present invention is used for multi-media equipment, which comprises a receiving unit for receiving digital information offered by communication network or broadcasting, a transmitting unit for transmitting digital information to the communication network, a management unit to control the entire system and provided with a filing device to accumulate information, a user ID reading unit for reading ID of users, a writing unit for writing digital information to a package medium where information can be written, a reading unit for reading digital information of a package medium where information is written, and a reproducing unit for reproducing image and audio information transferred from the above receiving unit or the reading unit, whereby each of the receiving unit, the transmitting unit, the management unit, the writing unit and the reading unit is provided with a function to set a utilization space ID, which can define a space where information can be utilized and a function to send a utilization space ID, to which own device belongs, by adding it to the information as an additional information during transfer when the information is transferred to the other devices, a utilization space definition information to define the utilization space where the information is handled and a user definition ID to define the users to use the information is added to the transferred information as an information ID for management, and unauthorized copying of the information is prevented by comparing the utilization space ID of the device, the utilization space definition, the user definition ID and the user ID.

In this system, when writing operation of the information is executed, the information can be written freely in case the utilization space definition of the information is not specified, while, in case the utilization space definition is specified, writing is permitted only when the utilization space ID of the information transmitter agrees with that of the receiver. The utilization definition ID is added to the information, and when writing operation or reproducing operation of the information is executed and if user definition ID of the information is not specified, anybody is allowed to write or reproduce the information. If the user definition ID is specified, only the user having the specified ID can write or reproduce the information. Further, when receiving information from the network, the utilization space ID where the information can be used is added to the received information and is transferred so that it can be used as an ID for prevention of subsequent copying.

There are two modes in the operation of this copy preventing system: a mode to prevent information sent from broadcasting and communication network for protection of information, and a mode to protect information offered or purchased as package medium.

First, description will be given on operation of the utilization space ID and the user ID in the copy preventing system for multi-media equipment of the present invention. The utilization space ID can be set when necessary to each equipment or device in the system by the management unit. As the utilization space ID, a utilization space ID to match the user as defined by the user in advance is used, and the management unit sets the utilization space ID to each of the devices depending upon the intended purpose and operates it. Therefore, for example, if 5 users use the system, 5 different types of utilization space IDs are operated as it is set to each device in response to the operation of the user. However, when viewed from the same user, it appears that the utilization space ID as defined by that user is uniformly set on the devices in the system as far as the user's own utilization is concerned. However, in case of the transmitter connected to the network, a different utilization space ID is added to prevent unauthorized outflow of the copyrighted information to the network.

According to the present invention, the information set from broadcasting and/or communication network is received by the receiving unit. In case it is recorded on the package medium, the information is transferred to the writing unit. In case it is stored and accumulated in the file, it is transferred to the management unit, which controls the filing unit. In this case, if the space utilizable for the information is specified, it is controlled in such manner that the information is not written to the space other than the specified space. This is defined in claim 2. In case total inhibition of writing is specified, writing of the information to a file or a package medium is inhibited, but it can be reproduced. In case the information is reproduced without recording, the information is transferred to the reproducing unit, and it is reproduced regardless of whether the utilization space is specified or not.

The information stored in the file of the management unit is protected when it is stored by adding the information of the utilization space definition to that information. The utilization space ID is added to the information received by the receiving unit and is transferred. Because the same ID is used for the utilization space ID within a normal system, ID of the management unit is consistent with ID of the information from the receiving unit, and this is written to the file of the management unit. In case the information stored in the above file is to be copied, the information is sent to the writing unit of the package medium in response to the instruction of the user. In the system of the present invention, private copying for personal use is permitted as legal or authorized utilization. To the information sent to the writing unit, a utilization space ID, a utilization space definition and a user definition ID are added. If the user of copying operation is the same as the user indicated in the user definition ID, copying is permitted, and the file information is written in the package medium. On the other hand, if the user of copying operation is different from the user of the user definition ID added to the information, copying is not permitted. Therefore, even when a user in the same system attempts to copy the information of another person existing in the file, copying cannot be performed. Unauthorized output of the information in the file of the management unit does not occur when an ID different from the utilization space ID of the other device is given to the utilization space ID of the transmitter.

Next, description will be given on the handling of the package medium where copying has been made. As far as a legally authorized user uses the copied information for private use, re-copying is allowed, and copying from second generation copying to third generation copying, i.e. from re-copying to re-re-copying, and further to re-re-re-copying, is freely allowed. However, the copy already prepared can be neither read nor reproduced by a person other than the legally recognized user, and it is not possible to utilize it even when it is tried to bring it to a device outside the system and to reproduce it. In this sense, it is a medium, which is of no use to the third party. Of course, the third party cannot copy it. For this purpose, the utilization space ID, the user definition ID and the utilization space definition are written simultaneously to the main component of the information during writing in the package medium. When the package medium is set to the reading unit and is operated to read, the utilization space ID and the user definition ID written in the package medium are read. The utilization space ID and the user ID on the reading unit are compared with each other. When these agree with each other, main component of the information is read as authorized reading. If not, the information is not read. It they do not agree with each other, the user is not legally recognized or the reading unit is not an authorized unit.

The reading unit is considered to be not correct in case the package medium is brought to a reading unit in a different space and illegal or unauthorized reading is performed by pretending to be a legal or authorized user. When authorized reading is performed, it is transferred to the reading unit in case it is re-copied. Then, it is written in another package medium. In case it is written in the file, it is transferred to the file of the management unit and is stored. In case the user wants to reproduce and enjoy it, it is transferred to a reproducing unit and it can be played back.

In case the information is offered as in commercial package medium, neither utilization space definition nor the user ID is written in it. When this package medium is reproduced on a reading unit, it can be read, and the utilization space ID of the reading unit is added as additional information to the main component of the information. In this case, the same ID is set to the utilization space ID of the management unit and the writing unit, and copying is achievable. The user ID is added as the user definition ID and the information is copied, and this corresponds to private utilization of the user. The handling of the package medium of the copy thus prepared is the same as in the case where information is offered by the network and is copied, and this is possible only in case of private use. In case the information read by the reading unit is reproduced and enjoyed by the user, the information is transferred to the reproducing unit where it can be reproduced. Transfer of the information offered as package medium is not permitted in the same system as described above.

The copy preventing system according to claim 1 of the present invention is used for multi-media equipment, which comprises a receiving unit for receiving digital information provided from a communication network or broadcasting, a transmitting unit for transmitting digital information to the communication network, a management unit for controlling the entire system and provided with a filing unit to accumulate the information, a user ID reading unit for reading ID of users, a writing unit for writing digital information to a package medium where information can be written, a reading unit for reading digital information of the package medium where information has been written, and a reproducing unit for reproducing the information, transferred from the above receiving unit and the reading unit, to image or audio information, whereby each of the receiving unit, the transmitting unit, the management unit, the writing unit, and the reading unit is provided with a function to set a user space ID, which can define a space where information can be utilized, and with a function to send by adding the utilization space ID, to which own device belongs to, as additional information when the information is transferred to other device, a utilization space definition information to define the utilization space to handle the information and a user definition ID to define the user who can utilize the information are added to the transferred information as information ID for management, and by comparing the utilization space ID of the device, the utilization space definition, the user definition ID and the user ID with each other, unauthorized copying of the information is prevented, whereby the information provided from network or package medium including broadcasting is protected from unauthorized copying by means of the utilization space definition to define whether the information utilization space added to the information is to be specified or not as well as the user definition ID to define the user, the utilization space ID added to the device, and the user ID to certify the user.

The system according to claim 2 of the present invention is the copy preventing system for multi-media equipment of claim 1, wherein, when writing operation of the information is executed, the information can be freely written in case information utilization definition is not specified, while, in case the utilization space definition is specified, writing is permitted only when the utilization space ID of the information transmitter is consistent with that of the receiver, and the information can be written only to the device in the utilization space defined by the information when the information is written to a file or a package medium.

The system according to claim 3 of the present invention is the copy preventing system for multi-media equipment of claim 1, wherein a user definition ID is added to the information, and in case writing operation or reproducing operation of the information is executed and the user definition ID of the information is not specified, anybody can write or reproduce the information, and in case the user definition ID is specified, only the user having the defined ID can write or reproduce the information, and only the user defined by the information can utilize the information and unauthorized copying can be prevented when the information is written or reproduced.

The system according to claim 4 of the present invention is the copy preventing system for multi-media equipment of claim 1, wherein, when receiving the information from the network, the information is transferred by adding a utilization space ID where the information can be utilized to the received information, and it is used as an ID for preventing subsequent copying, and the information is protected by adding a utilization space ID to define the space where the information from the network can be utilized so that it cannot be illegally utilized in the receiver and in the subsequent components and devices.

The system according to claim 5 of the present invention is the copy preventing system for multi-media equipment of claim 1, wherein, in case the information is to be written in an accumulating unit of the management unit or in a package medium, the information is written by adding not only main portion of the information but also the utilization space definition, the user definition ID and the utilization space ID in order to prevent illegal copying, and unauthorized utilization such as illegal copying of information can be prevented by writing the user definition ID and the like when the information is written to a package medium.

The system according to claim 6 of the present invention is the copy preventing system for multi-media equipment of claim 1, wherein an ID different from a utilization space ID of other device in the system is given to the utilization space ID of the transmitter, and it is designed that the information cannot be transmitted to outside from the transmitter unless the utilization space ID of the transfer source to transfer the information to the transmitter agrees with the utilization space ID of the transmitter, and the information is prevented from being sent out of the transmitter connected to the network so that the information once provided to the user may not be transmitted to the network from the system of the user and the right of the copyright holder may not be infringed.

The system according to claim 7 of the present invention is the copy preventing system for multi-media equipment of claim 1, wherein a specific code is assigned as a copy preventing code to the utilization space definition added to the main portion of the information, and in case there is the above code, copying of any information is inhibited, and this excludes any recording or copying of the provided information.

The system according to claim 8 of the present invention is the copy preventing system for multi-media equipment of claim 7, wherein in case the utilization space definition is not added to the information stored in the package medium, the utilization space ID of the reading unit is added to the information as additional information when the information is read from the package medium by the package medium reading unit and is transferred, and in case a specific code is added to the utilization space definition of the information, the information is read and transferred with the above code on it, and the information can be read and transferred if the utilization space ID of the additional information agrees with the utilization space ID of the reading unit, and if it does not agree, it is designed that the information cannot be read or transferred, and in case the information is read from the recorded package medium, the user can freely enjoy the information by means of a reproducing unit including the package media such as CD already in the market, while restriction or protection is provided in case the user tries to copy the information.

The system according to claim 9 of the present invention is the copy preventing system for multi-media equipment of claim 1, wherein, in case the information transferred from the reading unit of the package medium or from the receiving unit of the communication network is reproduced to image information or audio information by means of a display or a speaker, only the main portion of the information can be reproduced by neglecting the utilization space ID added to the information, and existing media or devices such as CD or CD reproducing unit can be utilized by connecting to the system of the present invention.

The system according to claim 10 of the present invention is the copy preventing system for multi-media equipment of claim 1, wherein the management unit is provided with a function to set a utilization space ID of the device in the system when necessary, and copy preventing function is fulfilled while setting the utilization space ID at real time depending upon utilization purpose, and the degree of freedom of the system can be improved by freely setting the management unit without fixing the utilization space ID added to each device.

BRIEF DESCRIPTION OF THE DRAWINGS

These objects and features of the present invention will become more readily apparent from the following detailed description of the preferred embodiments taken in conjunction with the accompanying drawings in which.

DETAILED DESCRIPTION OF THE INVENTION

Figure 1:
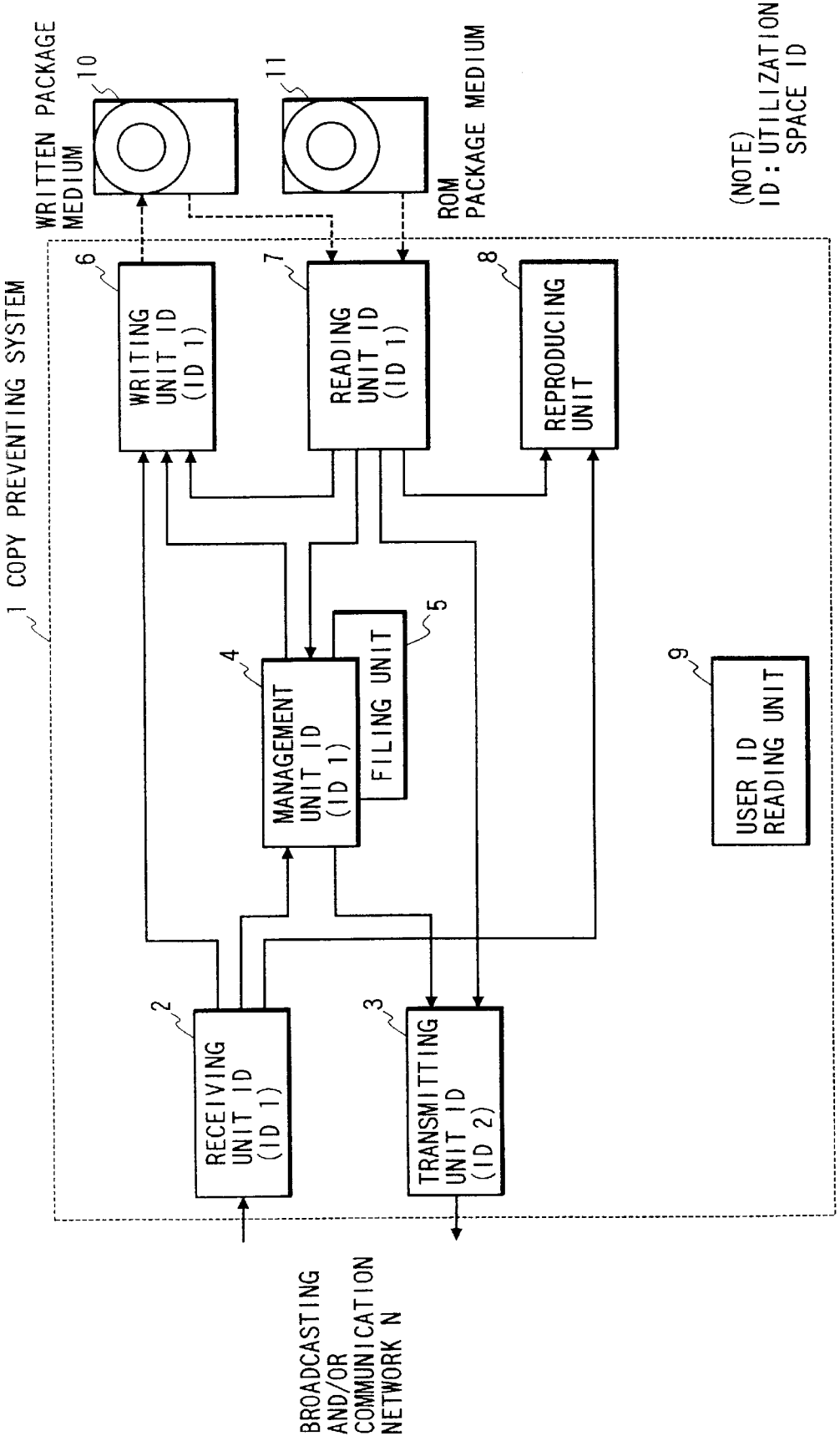
FIG. 1 is a block diagram of an arrangement of a copy preventing system for multi-media equipment according to an embodiment of the present invention.

In the following, description will be given on embodiments of the present invention referring to the drawings. FIG. 1 is a block diagram of an arrangement of a copy preventing system for multi-media equipment according to an embodiment of the present invention. The multi-media equipment in the present embodiment comprises a receiving unit 2 connected to an external broadcasting and/or communication network to provide information and for receiving the provided information in response to broadcasting and/or communication network N, a transmitting unit 3 for transmitting the information to external broadcasting and/or communication network N, a management system 4 for controlling the system, a filing unit 5 belonging to the management unit and for accumulating information, a writing unit 6 for writing the information to a writable package medium, a reading unit 7 for reading the information from a package medium 10 where the information is written or from a ROM package medium 11, a reproducing unit 8 represented by a display unit, which displays and reproduces the information received or read, and a user ID reading unit 9 for certifying the user in case the user utilizes the information.

Figure 2:
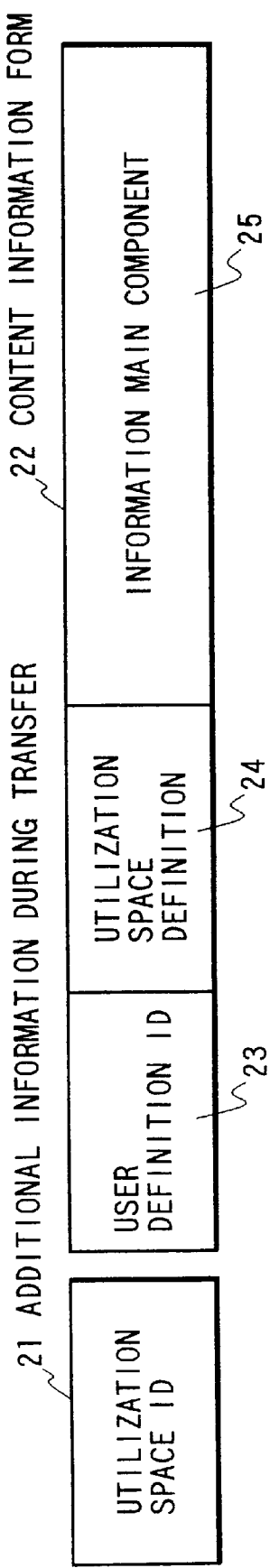
FIG. 2 shows a form of information handled in the present system.

The receiving unit 2 is provided with a function to receive the provided digital information in response to the broadcasting and/or communication network, and with a function to add a user definition ID 23 and a utilization space definition 24 to the information in case the received information consists only of a main portion of the information 25 as shown in FIG. 2. Each of the receiving unit 2, the transmitting unit 3, the management unit 4 (including the filing unit 5), the writing unit 6 and the reading unit 7 is provided with a function to set a utilization space ID to define a space where the information can be utilized, and with a function to send the information by adding a utilization space ID, to which own device belongs, as an additional information when the information is transferred to the other device. The management unit 4 controls operation of the entire multi-media equipment depending upon the intended purpose of the user, controls the information to be handled, and comprises a filing unit to accumulate the information.

FIG. 2 represents a form of the information handled by the present system. In FIG. 2, the information comprises an information main portion 25 to be utilized by a user, a user definition ID 23 to define the user who can utilize the information, a content information form 22, consisting of a utilization space definition 24, which specifies whether the space where the information is utilizable is defined or not, and an information form to send the information by adding a utilization space ID of a transfer source as an additional information 21 in case the content information form 22 is transferred in the system.

Next, operation of the present embodiment will be described. When sent from an information provider via the receiving unit 2 connected to the broadcasting and communication network N, the information comprises only the information main component 25 or a format of the content information form 22. In case it comprises only the information main component 25, the user definition ID 23 and the utilization space definition 24 are added in the receiving unit 2, and turning to format of the content information form 22, the information is transferred to the other devices. In this case, there is no user definition, and ID 1, i.e. a utilization space ID of the receiving unit, which means a space where the information is utilized, is entered in the receiving unit 2. As a result, any user can freely utilize the information, while the information cannot be utilized except in the space of ID 1.

On the other hand, in case the information sent from the broadcasting and/or communication network N is in the format of the content information form 22 from the initial stage, the user definition ID 23 and the utilization space definition 24 are specified by the information provider in advance, and this control the user who can utilize the information or the space where the information can be utilized.

In case the information from the receiving unit 2 is displayed and utilized on a display of the reproducing unit 8 without accumulating it in the filing unit 5, it is compared and checked who the user is by checking by means of the user ID reading unit 9 and by comparing with the user definition ID 23. If the user is a legal or authorized user, the information main component is displayed and utilized. In case reproducing operation of the information is executed and the user definition ID 23 of the information is not specified, anybody can reproduce the information.

In case the information is accumulated for once and is utilized, after checking validity of the user, the information is transferred to the filing unit 5 of the controller or to the writing unit 6. In accumulating and recording the information, the utilization space ID of the filing unit 5 or the writing unit 6 is compared with the utilization space ID 21 added to the information. If they agree with each other, writing is allowed as the utilization in the same utilization space. This makes it possible to write the information to the filing unit 5 or to write to the package medium 10 by the writing unit 6. In contrast, in case the utilization space ID of the filing unit 5 or the writing unit 6 does not agree with the utilization space ID 21 added to the information, writing is not allowed because it is a utilization in a deferent utilization space. When writing the information, it is recorded in the format of the information form as shown in FIG. 2.

In case a writing operation of the information is executed, writing can be freely achieved if the utilization space definition 24 of the information is not specified. The same applies to the user definition. In case a writing operation of the information is executed by adding the user definition ID 23 to the information, and if the user definition ID 23 of the information is not specified, anybody can write the information. If the user definition ID 23 is specified, only the user having the specified ID can write the information.

In case the package medium 10 where information has been written is to be read, the utilization space ID 21 where information has been written is compared with the utilization space ID of the reading unit 7. If they agree with each other, reading is allowed. When it is tried to utilize the information by bringing the package medium 10 to another utilization space, e.g. to another house or another device, the information cannot be read because the utilization space ID 21 of the information form of FIG. 2 does not agree with the utilization space ID of the reading unit. That is, information can be neither utilized nor copied.

In case reading operation of the information is executed, the user can freely read the information if the utilization space definition 24 of the information is not specified. The same applies to the user definition. In case reading operation of the information is executed by adding the user definition ID 23 to the information and if the user definition ID 23 of the information is not specified, anybody can read the information. If the user definition ID 23 is specified, only the user having the specified ID can read the information.

In case the information read in the reading unit 7 is to be copied to the filing unit 5 of the management unit 4 or to the writing unit 6, the utilization space ID of the filing unit 5 or the writing unit 6 is compared and checked with the utilization space ID added to the information and the user is checked, and copying is allowed only when it is authorized.

When ROM package medium is read and if the written format is the information form of FIG. 2, the information is read by the procedure already described. If format is only that of the information main component 25 as in the case of the existing CD and when the information is transferred to the content information form 22 in the reading unit 7, it is converted to the information added with the additional information 21 as in the case of receiving from the broadcasting and/or communication network N. The utilization space ID 21 of the reading unit 7 is written as the additional information during transfer, and the information is transferred to the other device. The subsequent operation is the same as in the transfer of information from the receiving unit 2 as already described. The copy prepared by this operation can be utilized only in the same space where the copy has been prepared and only in case of the allowed user. The copy cannot be utilized in a different utilization space or in case of unauthorized user.

In case the information is transferred to outside via the broadcasting and/or communication network N, outflow of the information to the broadcasting and/or communication network N can be prevented if an ID different from the utilization space ID of the other device is added to the utilization space ID of the transmitting unit 3. To change the utilization space ID of the transmitting unit 3 from the utilization space ID of the other device means that the space of the transmitting unit 3 connected to the broadcasting and/or communication network N is different from the utilization space. For example, to the information read from the filing unit 5 and the reading unit 7, the utilization space ID 1 is added as the additional information 21 during transfer. If this information is transferred to the transmitting unit 3, it is compared with ID 2, which is the utilization space ID of the transmitting unit. Because these are not the same ID, it is not accepted, and the information cannot be sent to outside.

In case a specific code is assigned to the utilization space definition 24 added as a copy preventing code to the information main component and this code is present in the utilization space definition 24, it can be designed that copying of any information can be prohibited.

In case the information transferred from the reading unit 7 of the package medium or from the receiving unit 2 of the broadcasting and/or communication network N is reproduced to image information or audio information by the reproducing unit 8 such as a display or a speaker, it is possible to design that only the information main component can be reproduced by neglecting the utilization space ID added to the information.

Further, it may be designed in such manner that the management has a function to set the utilization space ID of each device in the system when necessary and that copy preventing function is fulfilled while setting the utilization space ID at real time depending upon the purpose.

The system of the present invention is characterized in that the prevention of unauthorized copying is managed and controlled by defining the user utilizing the information and the space where the information is utilized. In the conventional type prevention of copying, copying has been prevented by checking compatibility of the user or by excluding multiplication of copying limitlessly such as serial copy management. However, there are problems in such methods in that the information of media such as CD or VTR may be copied limitlessly or that authorized private use of the information, which was obtained by authorized means, may also be restricted.

In the present invention, the utilization of information is controlled by checking the compatibility of the user and the space utilizable. Even when the information has no specified user, it is possible to make it not utilizable except in the utilization space. For example, the package medium copied in a private home can be freely utilized in that home, while it cannot be utilized when it is brought to another home.

Further, in a society covered by a network, there is always the possibility that information may be distributed or diffused through the network. In particular, when the network enters private homes, the information offered to private homes may be inadvertently or illegally diffused to an indefinite number of users. By handling the private homes and outside the private homes as different types of space as in the present invention, it is possible to prevent erroneous or illegal diffusion of the information, which has been distributed from the network or which enters the private homes as package medium.

The present system effectively provides functions to various type of information such as CD, VTR, LD, etc., which have been distributed as social assets and stored in private homes, and it is possible to prevent unauthorized copying of the information or to exclude distribution and diffusion of the information to the network.

It should be understood that the foregoing relates only to preferred embodiments of the present invention, and that it is intended to cover all changes and modifications of the embodiments of the invention herein used for the purpose of the disclosure, which do not constitute departures from the spirit and scope of the invention.

What is claimed is:

1. A copy preventing system for multi-media equipment, comprising:

a receiving unit for receiving digital information provided by a communication or broadcasting network, a transmitting unit for transmitting digital information to the communication network, a management unit for managing the entire system and having a filing unit to store information, a user ID reading unit for reading ID of users, a writing unit for writing digital information to a package medium where the information can be written, a reading unit for reading digital information from a package medium where information is written, and a reproducing unit for reproducing information transferred from the receiving unit and the reading unit to image or audio information;

wherein each unit, including the receiving unit, the transmitting unit, the management unit, the writing unit and the reading unit, has a function to set an equipment utilization space ID, which defines a space where particular information can be utilized, and has a further function to send the equipment utilization space ID, to which said each unit belongs, as additional information during a transfer operation when the particular information is transferred to another unit; and wherein a utilization space definition, defining the utilization space where the information is handled, and a user definition ID, defining a user who can utilize the information, are added to particular information to be transferred, and wherein unauthorized utilization of the information is prevented by comparing the utilization space definition added to transferred information with the equipment utilization space ID of the equipment and by comparing the user definition ID with the user ID of the multi-media equipment.

2. A copy preventing system for multi-media equipment according to claim 1, wherein, when a writing operation of the information is to be executed and a utilization space definition of the information is not specified, the information can be written finely while, when a utilization space definition is specified for the information, writing of the information is allowed only when the utilization space ID of the transmitting unit agrees with that of the receiving unit.

3. A copy preventing system for multi-media equipment according to claim 1, wherein, when a writing or reproducing operation of the information is to be executed and a user definition ID of the information is not specified, any user may write or reproduce the information while, when the user definition ID of the information is specified, only a user who has the ID defined by said user definition ID may write or reproduce the information.

4. A copy preventing system for multi-media equipment according to claim 1, wherein, when receiving information from the network, the utilization space ID indicating the utilization space where the information can be utilized is added to the received information and the information is transferred, and said added utilization space ID is used as an ID for preventing subsequent copying of the information.

5. A copy preventing system for multi-media equipment according to claim 1, wherein said writing unit functions, when writing information to said filing unit of the management unit or to a package medium, for adding the utilization space definition, the user definition ID and the equipment utilization space ID to the information to prevent unauthorized copying of the information.

6. A copy preventing system for multi-media equipment according to claim 1, wherein
   said transmitting unit has a utilization space ID different from utilization space ID or IDs of other units in the system, and
   said transmitting unit is arranged so that the information cannot be transmitted outside from the transmitter unless the utilization space ID of a transfer source to transfer the information to the transmitting unit agrees with the utilization space ID of the transmitting unit.

7. A copy preventing system for multi-media equipment according to claim 1, wherein a specific code is assigned as a copy preventing code to the utilization space definition added to a main component of the information, and copying of any information is prohibited in case said specific code is present.

8. A copy preventing system for multi-media equipment according to claim 1, wherein,
   in case a utilization space definition is not included with information stored in the package medium and the stored information is read by the package medium reading unit and is to be transferred, the equipment utilization space ID of the package medium reading unit is added to the read information as additional information during transfer and the added information is transferred with the read information, and
   in case a utilzation space definition is included with the stored information and a specific code is included with the utilization space definition of the stored information, the stored information is read with said specific code and is transferred with said specific code, and
   the stored information can be read and transferred when the equipment utilization space ID of the additional information added to the information during transfer agrees with the equipment utilization space ID of the reading unit,
   while the information can be neither read nor transferred in case the equipment utilization space ID of the additional information and the equipment utilization space ID of the reading unit do not agree with each other.

9. A copy preventing system for multi-media equipment according to claim 8, wherein said specific code included with the utilization space definition of the stored information comprises a code for preventing copying.

10. A copy preventing system for multi-media equipment according to claim 9, wherein copying of the stored information is prohibited when said code for preventing copying is present.

11. A copy preventing system for multi-media equipment comprising:
   a receiving unit for receiving digital information provided by a communication network or a broadcast, a transmitting unit for transmitting digital information to the communication network, a management unit for managing the entire system and having a filing unit to store information, a user ID reading unit for reading ID of users, a writing unit for writing digital information to a package medium where the information can be written, a reading unit for reading digital information from a package medium where information is written, and a reproducing unit for reproducing information transferred from the receiving unit and from the reading unit to image or audio information;
   wherein each unit, including the receiving unit, the transmitting unit, the management unit, the writing unit and the reading unit has a function to set an equipment utilization space ID, which defines a space where the information can be utilized, and has a further function to send the equipment utilization space ID, identifying the space to which said each unit belongs, as additional information during a transfer operation when information is transferred to another unit;
   wherein a utilization space definition, defining the utilization space where the information is handled and a user definition ID, defining a user who can utilize the information are added to information to be transferred,
   wherein unauthorized copying of the information is prevented by comparing the equipment utilization space ID of the equipment with the utilization space definition and by comparing the user definition ID with the user ID, and
   wherein, in case the utilization space definition is not added to the information stored in the package medium and when the information is read by the package medium reading unit and is transferred, the utilization space ID of the reading unit is added to the information as an additional information during transfer and the information is transferred, and in case a specific code for preventing copying is added to the utilization space definition of the information, the information is read with said specific code on it and is transferred, and the information can be read and transferred when the utilization space ID of the additional information during transfer agrees with the utilization space ID of the reading unit, and the information can be neither read nor transferred in case the utilization space ID of the additional information and the utilization space ID of the reading unit do not agree with each other.

12. A copy preventing system for multi-media equipment according to claim 1, wherein, in case information transferred from the package medium reading unit or from the communication network receiving unit is reproduced to image information or audio information by a display or a speaker, the reproducing unit can reproduce only the information by neglecting the utilization space ID added to the information.

13. A copy preventing system for multi-media equipment according to claim 1, wherein the management unit func-tions to set a utilization space ID of each unit in the system when necessary, and said management unit sets the utilization space ID of each unit at a real time corresponding to the utilization purpose to prevent copying.

\* \* \* \* \*